US012003465B2

(12) United States Patent
Nguyen et al.

(10) Patent No.: US 12,003,465 B2
(45) Date of Patent: *Jun. 4, 2024

(54) PRIORITY BASED COEXISTENCE

(71) Applicant: QUALCOMM Incorporated, San Diego, CA (US)

(72) Inventors: Tien Viet Nguyen, Bridgewater, NJ (US); Arjun Bharadwaj, Cupertino, CA (US); Kapil Gulati, Belle Mead, NJ (US); Sudhir Kumar Baghel, Fremont, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,441

(22) Filed: Dec. 29, 2021

(65) Prior Publication Data
US 2022/0255714 A1     Aug. 11, 2022

Related U.S. Application Data

(63) Continuation of application No. 16/681,790, filed on Nov. 12, 2019, now Pat. No. 11,218,289.

(Continued)

(51) Int. Cl.
*H04L 5/16*        (2006.01)
*H04L 5/14*        (2006.01)
(Continued)

(52) U.S. Cl.
CPC .............. *H04L 5/16* (2013.01); *H04L 5/1469* (2013.01); *H04W 88/06* (2013.01); *H04W 92/18* (2013.01)

(58) Field of Classification Search
CPC .... H04L 5/16; H04L 5/1469; H04W 72/1242; H04W 16/14; H04W 88/06; H04W 72/1215; H04W 92/18
See application file for complete search history.

(56) References Cited

U.S. PATENT DOCUMENTS 10,292,136 B2 *   5/2019   Rubin ..................... H04W 4/12
10,939,454 B2     3/2021   Chen et al.
(Continued)

FOREIGN PATENT DOCUMENTS

CN         112514485 A      3/2021
WO    2016093981 A1      6/2016
(Continued)

OTHER PUBLICATIONS

Interdigital Inc: "Discussion on Coexistence between NR V2X and LTE V2x", 3GPP Draft; R1-1811217 Discussion on Coexistence Between NR V2X and LTE V2X, 3rd Generation Partnership Project (3GPP), Mobile Competence Centre ; vol. RAN WG1, No. Chengdu, China XP051518618 (Year: 2018).*
(Continued)

*Primary Examiner* — Mehmood B. Khan
(74) *Attorney, Agent, or Firm* — Procopio, Cory, Hargreaves & Savitch LLP/QUALCOMM Incorporated

(57) ABSTRACT

An apparatus may comprise a component for communicating using a first RAT and another component for communicating using a second RAT. Overlapping communication using the two RATs may cause problems for proper reception at the apparatus. The apparatus may detect that transmission or reception of a first packet using a first RAT will overlap in time with reception of a second packet using a second RAT. The apparatus prioritizes the first packet or the second packet based at least on a relative priority of the first packet and the second packet.

68 Claims, 7 Drawing Sheets

Related U.S. Application Data

(60) Provisional application No. 62/780,900, filed on Dec. 17, 2018.

(51) Int. Cl.
 H04W 88/06 (2009.01)
 H04W 92/18 (2009.01)

(56) References Cited

U.S. PATENT DOCUMENTS

| | | | |
|---|---|---|---|
| 11,218,289 B2* | 1/2022 | Nguyen | H04W 72/569 |
| 2012/0099456 A1 | 4/2012 | Tamura et al. | |
| 2013/0279491 A1* | 10/2013 | Rubin | G08G 1/162 370/347 |
| 2015/0208440 A1 | 7/2015 | Agiwal et al. | |
| 2016/0255639 A1 | 9/2016 | Chen et al. | |
| 2018/0206260 A1 | 7/2018 | Khoryaev et al. | |
| 2019/0013881 A1* | 1/2019 | Olesen | H04B 15/00 |
| 2019/0150147 A1 | 5/2019 | Lee et al. | |
| 2020/0008026 A1* | 1/2020 | Martinez | H04W 4/12 |
| 2020/0015255 A1 | 1/2020 | Khoryaev et al. | |
| 2020/0045724 A1 | 2/2020 | Lu et al. | |
| 2020/0053743 A1* | 2/2020 | Cheng | H04W 4/40 |
| 2020/0084669 A1 | 3/2020 | Belleschi | |
| 2020/0107236 A1 | 4/2020 | Tseng et al. | |
| 2020/0145867 A1* | 5/2020 | Tseng | H04W 24/10 |
| 2020/0305167 A1 | 9/2020 | Freda et al. | |
| 2022/0255714 A1* | 8/2022 | Nguyen | H04W 72/569 |
| 2023/0106128 A1* | 4/2023 | Lee | H04W 72/1268 370/329 |

FOREIGN PATENT DOCUMENTS

| | | |
|---|---|---|
| WO | 2017197264 A1 | 11/2017 |
| WO | 2018031172 A1 | 2/2018 |
| WO | 2018129543 A1 | 7/2018 |

OTHER PUBLICATIONS

CATT: "Discussion on Coexistence of LTE Sidelink and NR Sidelink in NR V2X", R1-1812624, 3GPP TSG RAN1 Meeting #95, Spokane, USA, Nov. 12-16, 2018, 7 Pages.

Interdigital Inc: "On Coexistence of LTE V2X Sidelink and NR V2X Sidelink", R1-1813232, 3GPP TSG RAN WG1 Meeting #95, Spokane, USA, Nov. 12-16, 2018, 4 Pages.

Zte, et al., "Coexistence Between NR V2X and LTE V2X", R1-1813178, 3GPP TSG RAN WG1 Meeting #95, Spokane, USA, Nov. 12-16, 2018, 4 Pages.

Zte, et al., "In-Device Coexistence Between NR V2X and LTE V2X", R2-1816996, 3GPP TSG RAN WG2 #104, 3GPP Server Laid-Open Date, Nov. 12-16, 5 Pages.

Intel Corporation: "In-device Coexistence Mechanisms for eV2X Services," 3GPP Draft, 3GPP TSG RAN WG1 Meeting #95, R1-1812496, Intel—EV2X_COEX, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018, (Nov. 11, 2018), XP051554440, 11 pages, URL: http://www.3gpp.org/ftp/Meetings%5F3GPP%5FSYNC/RAN1/Docs/R1%2D1812496%2Ezip [retrieved on Nov. 11, 2018], Chapters 3, 4.2 and 5.1.

Interdigital Inc: "Discussion on Coexistence Between NR V2X and LTE V2X," 3GPP Draft, 3GPP TSG RAN WG1 Meeting #94bis, R1-1811217, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051518618, 3 pages, Retrieved from the Internet: URL: http://www.3gpp.org/ftp/tsg%5Fran/WG1%5FRL1/TSGR1%5F94b/DOCS/R1%2D1811217%2Ezip [retrieved on Sep. 29, 2018], chapters 1 and 2.

International Preliminary Report on Patentability—PCT/US2019/061236, The International Bureau of WIPO—Geneva, Switzerland, dated Jul. 1, 2021.

International Search Report and Written Opinion—PCT/US2019/061236—ISA/EPO—dated Feb. 24, 2020.

* cited by examiner

PRIORITY BASED COEXISTENCE

CROSS-REFERENCE TO RELATED APPLICATION

This is a continuation application of U.S. Non-provisional application Ser. No. 16/681,790, entitled "PRIORITY BASED COEXISTENCE" and filed Nov. 12, 2019, which claims the benefit of U.S. Provisional Application Ser. No. 62/780,900, entitled "Priority Based Coexistence" and filed on Dec. 17, 2018, which is expressly incorporated by reference herein in its entirety.

INTRODUCTION

The present disclosure relates generally to communication systems, and more particularly, to vehicle-to-vehicle (V2V), vehicle-to-everything (V2X), or other device-to-device (D2D) communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication is provided. The method includes detecting that a transmission or reception of a first packet at a device using a first RAT will overlap in time with reception of a second packet at the device using a second RAT. The method includes prioritizing the first packet or the second packet based at least on a relative priority of the first packet and the second packet.

In another aspect of the disclosure, an apparatus for wireless communication is provided. The apparatus includes means for detecting that a transmission or reception of a first packet at a device using a first RAT will overlap in time with reception of a second packet at the device using a second RAT. The apparatus also includes means for prioritizing the first packet or the second packet based at least on a relative priority of the first packet and the second packet.

In another aspect of the disclosure, an apparatus for wireless communication is provided. The apparatus includes a memory and at least one processor coupled to the memory, the memory and the processor configured to detect that a transmission or reception of a first packet at a device using a first RAT will overlap in time with reception of a second packet at the device using a second RAT and prioritize the first packet or the second packet based at least on a relative priority of the first packet and the second packet.

In another aspect of the disclosure, a computer-readable medium, such as a non-transitory computer-readable medium, for wireless communication is provided. The computer-readable medium stores computer executable code, the code when executed by a processor cause the processor to detect that a transmission or reception of a first packet at a device using a first RAT will overlap in time with reception of a second packet at the device using a second RAT and prioritize the first packet or the second packet based at least on a relative priority of the first packet and the second packet.

Aspects may further include that the reception of the second packet is prioritized over transmission or reception of the first packet if the second packet has a higher priority level than the first packet. Aspects may further include determining a priority level of the second packet based on a prior reception of at least one prior packet using the second RAT. Aspects may further include that the reception of the second packet is based on reserved semi-persistent scheduling of resources. Aspects may further include transmitting or receiving the first packet when the first packet has a higher priority level than the second packet. Aspects may further include performing resource reselection for the first packet when the second packet is prioritized. Aspects may further include skipping transmission or reception of the first packet when the first packet has a lower priority level than the second packet. Aspects may further include modifying a transmission using the first RAT when the first packet has a lower priority than the second packet. Modifying the transmission using the first RAT may comprise modifying a periodicity of the transmission using the first RAT. The first packet may comprise a first V2X packet and the second packet comprises a second V2X packet. The first RAT may comprise NR, and the second RAT may comprise LTE.

Aspects may include the interruption level being based on a priority level of an application associated with the first packet. The first packet or the second packet may be prioritized further based on the interruption level of the first packet. A higher priority application may have a lower interruption level and a lower priority application has a higher interruption level. A configuration may be received of the interruption level for the application prior to determining that the first packet will overlap in time with the reception of the second packet. The interruption level may be based on a defined mapping to the priority level. The interruption level may correspond to an amount of time over which an interruption rate is calculated. A second application may be associated with the second packet, and aspects may further include determining the interruption level for the second packet associated with the second application based on at least one prior transmission received using the second RAT, the at least one prior transmission being associated with the second application.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
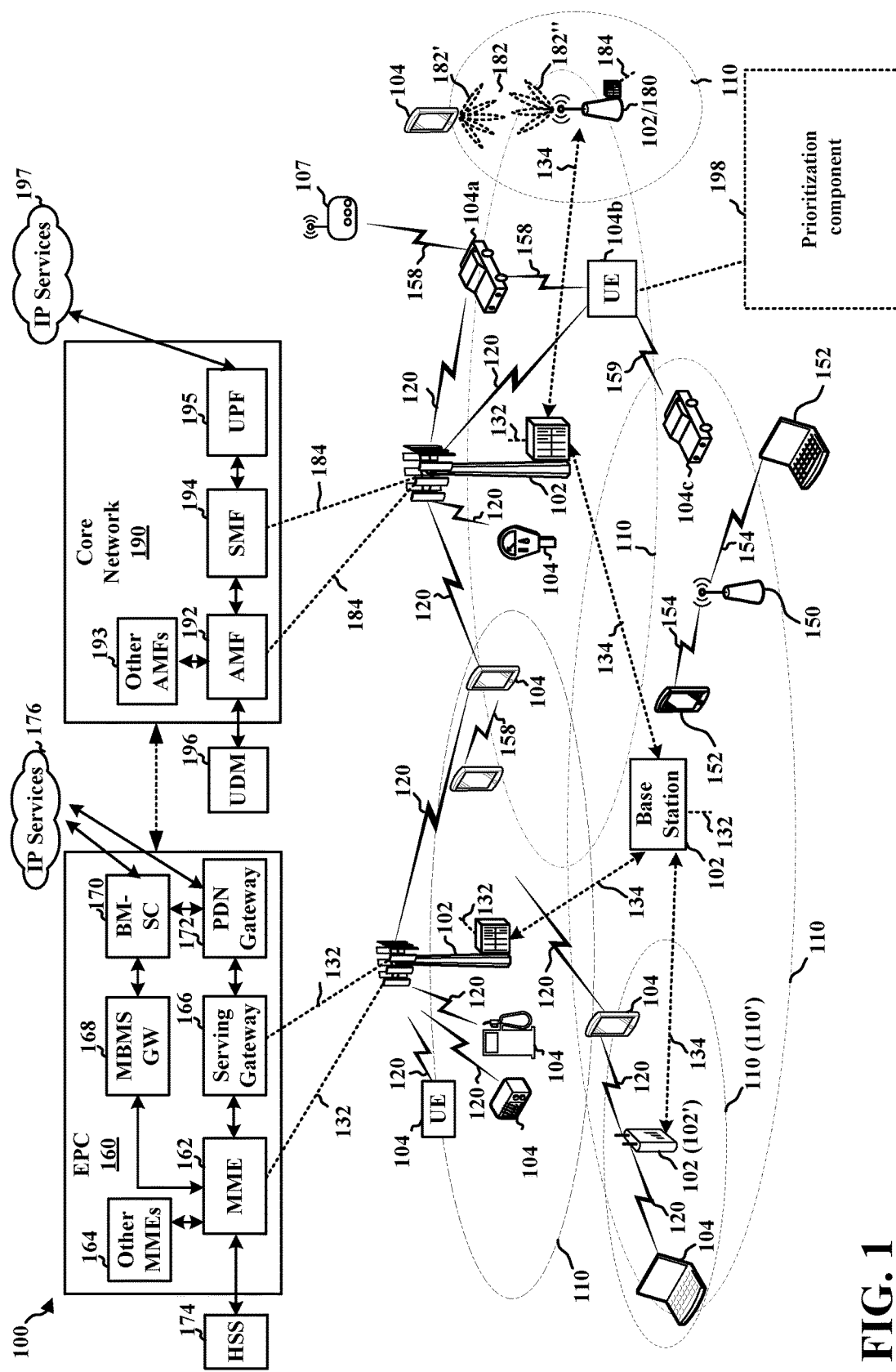
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A wireless device, such as a UE, may be capable of communicating using multiple RATs. For example, a device may have the capability for D2D communication, such as V2X, V2V, etc., based on LTE and also have capability for D2D communication, such as V2X, V2V, etc., using NR. Overlapping communication using the two RATs may cause reception or transmission problems at the apparatus. For example, NR V2X and LTE V2X may be configured on different frequency bands or on different frequency channels within the same frequency band. Thus, the two types of communication may use different portions of the frequency spectrum. The use of different frequency channels within the same frequency band may lead to half-duplex constraints that limit transmission/reception for one RAT from occurring at the same time as a transmission for the other RAT. In order to ensure accurate communication, the present application provides aspects of coexistence management that manages half duplex constraints between the two types of communication, e.g., communication based on different RATs, using priorities of the packet transmissions.

Coexistence issues may arise, for example, when an NR V2X packet from a device would overlap in time with reception of an LTE V2X packet at the device. In order to manage the coexistence of the V2X communication based on different RATs, the device may prioritize reception of the LTE V2X packet from UE over transmission of the NR V2X packet based on an interruption level for the NR V2X packet. Similarly, coexistence issues may arise when an LTE V2X packet from the device would overlap in time with reception of an NR V2X packet at the device. In order to manage the coexistence of the V2X communication based on different RATs, the device may prioritize one of the packets based on a relative priority of the packet. For example, the device may prioritize transmission of the LTE V2X packet over reception of the NR V2X packet based, at least in part, on a relative priority of the LTE V2X packet. In some aspects, the device may prioritize one of the packets based on an interruption level for the LTE V2X packet or the NR V2X packet.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction.

The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB (e.g., base station 180) may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example,

FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as ProSe, etc. Communication based on V2V, V2X, V2I, and/or other D2D may also be transmitted and received by other transmitting and receiving devices, such as RSU 107, etc. Aspects of the communication may be based on PC5 or sidelink communication e.g., as described in connection with the example in FIG. 2. Although the following description may provide examples for D2D communication, such as V2X, in connection with 5G NR and LTE, the concepts described herein may be applicable to other similar areas, such as LTE-A, CDMA, GSM, and other wireless technologies.

Referring again to FIG. 1, in certain aspects, a device such as UEs 104a, 104b, 104c, e.g., a transmitting Vehicle User Equipment (VUE) or other UE, may be configured to transmit communication directly to another UE, such as using communication link 158 or 159. The communication may be based on D2D communication such as V2V, V2X, Proximity Services (ProSe), etc. D2D communication, such as V2V, V2X, etc., may also be transmitted and received by other transmitting and receiving devices, such as Road Side Unit (RSU) 107, base station, etc. Aspects of the communication may be based on PC5 or sidelink communication.

Referring again to FIG. 1, in certain aspects, UE 104b, may be configured to determine that transmission a first packet from UE 104b to UE 104a over communication link 158 using a first RAT will overlap in time with reception of a second packet from UE 104c over communication link 159 using a second RAT. The first and second packet may both be D2D transmissions, such as V2X, V2V, etc., yet may use different RATs, e.g., NR and LTE. The UE 104b may comprise a prioritization component 198 that is configured to determine whether to prioritize the first packet or the second packet based at least on a relative priority of the first packet and the second packet. For example, the apparatus may prioritize the reception of the second packet over transmission of the first packet when the second packet has a higher priority than the first packet. The UE 104b may prioritize a packet based on an interruption level of the first packet or the second packet. For example, the UE 104b may prioritize reception of the second packet over transmission of the first packet when the interruption level is not met and may prioritize transmission of the first packet over the reception of the second packet when the interruption level is met. For example, the UE 104*b* may prioritize LTE V2X reception over an NR V2X transmission until the interruption level is met.

Figure 2:
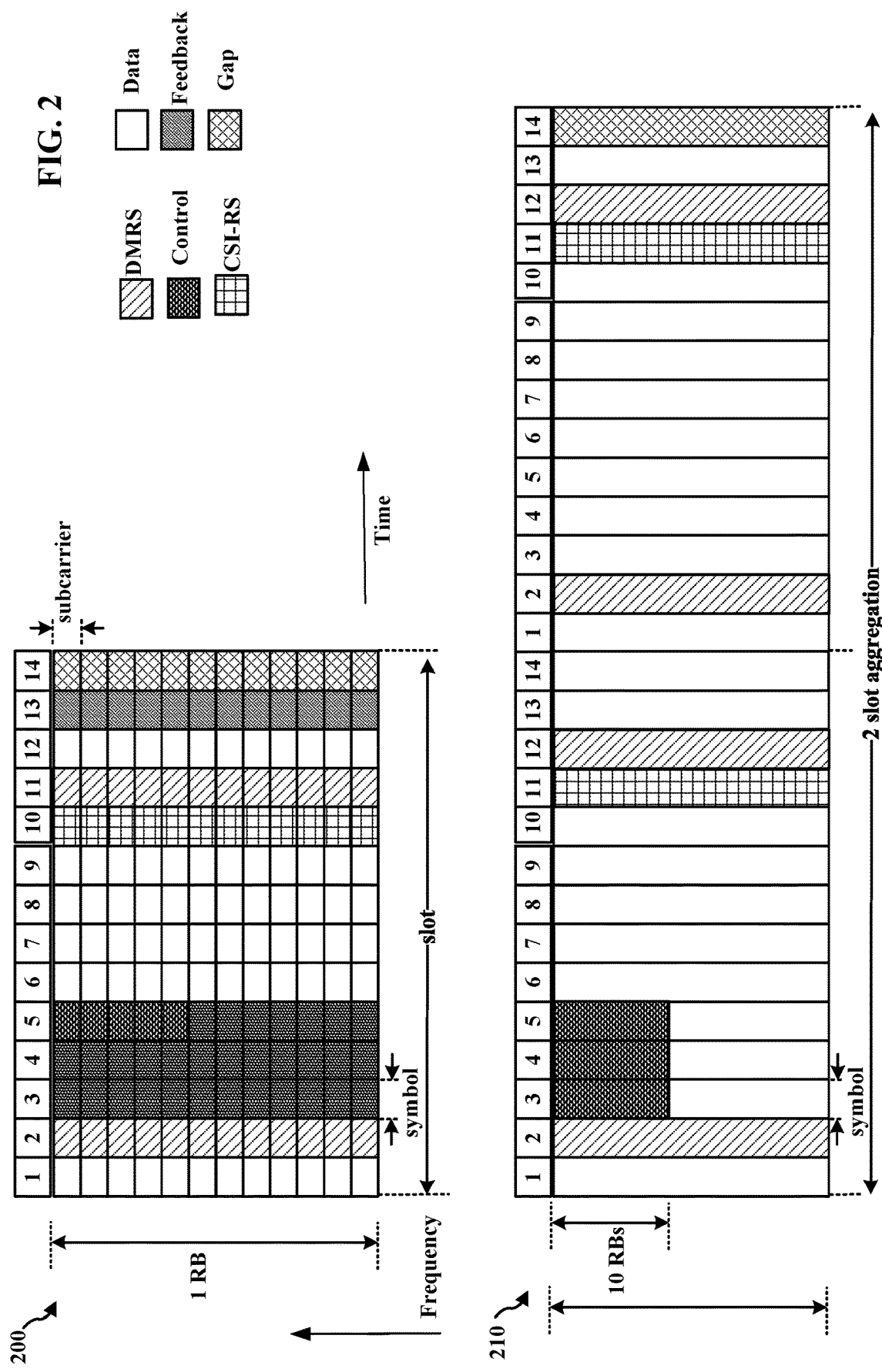
FIG. 2 illustrates an example of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
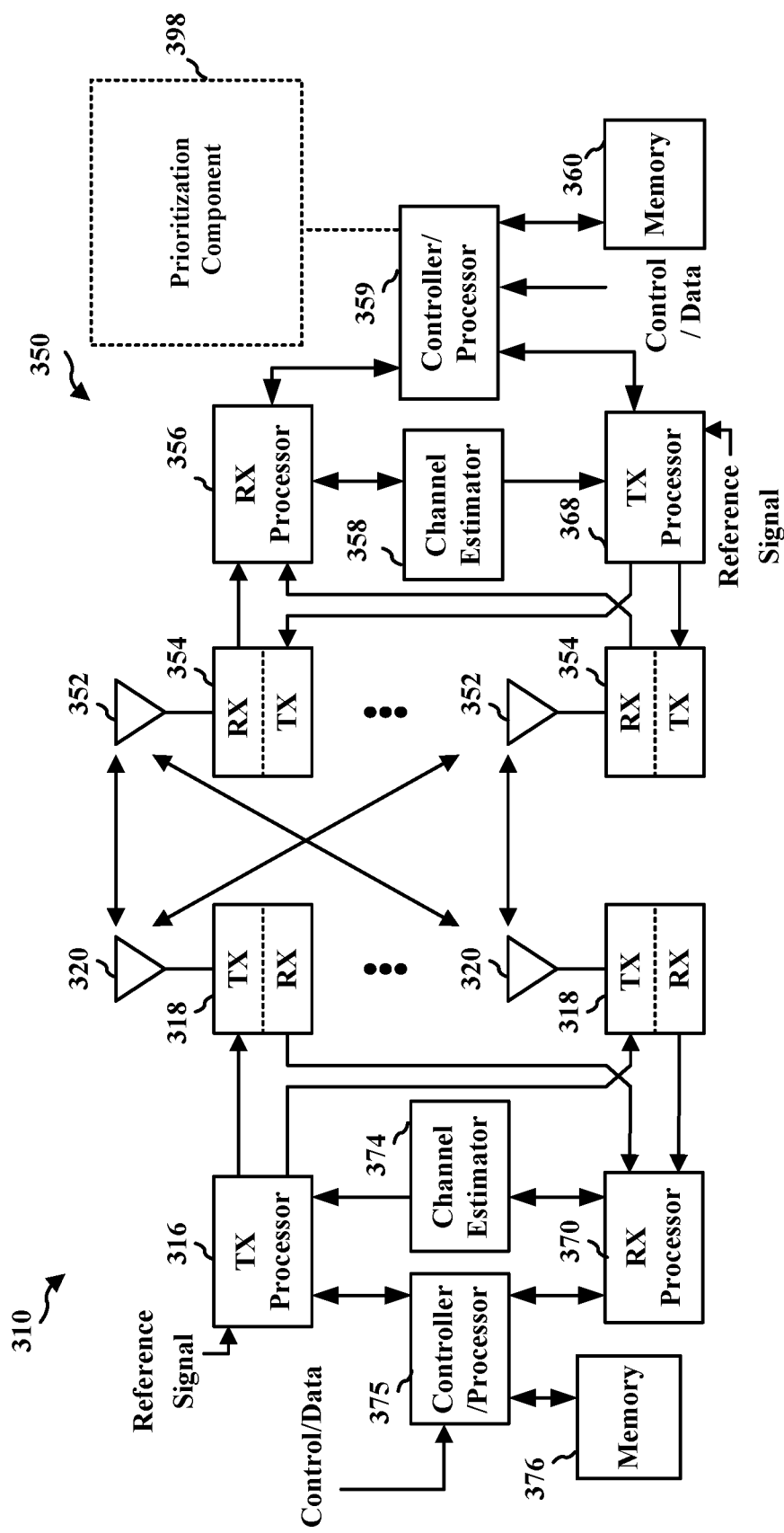
FIG. 3 is a diagram illustrating an example of a first device and a second device involved in wireless communication based, e.g., on V2V, V2X, and/or other D2D communication.

FIG. 3 is a block diagram of a first wireless communication device 310 in communication with a second wireless communication device 350. The device 310 may comprise a transmitting device communicating with a receiving device, e.g., device 350, based on D2D communication, such as V2X, V2V, etc. The communication may be based, e.g., on sidelink. The device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

Device 350 may communicate using D2D communication, such as V2X, V2V, etc., based on different RATs. For example, device 350 may comprise component(s) for communicating using NR V2X communication and component (s) for communicating using LTE V2X communication. Device 350 may be configured to determine that transmission or reception of a first packet (e.g., NR V2X packet) using a first RAT will overlap in time with reception of a second packet (e.g., LTE V2X packet) using a second RAT. Device 350 may comprise a prioritization component 398 configured to prioritize the first packet or the second packet based on relative priority of the first packet and the second packet or based on an interruption level of the first packet or the second packet. For example, the apparatus may prioritize the reception of the second packet over transmission/reception of the first packet when the interruption level is not met and may prioritize the first packet over the reception of the second packet when the interruption level is met. While prioritization component 398 is only illustrated for device 350, device 310 may comprise a similar prioritization component 398.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device

350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

Figure 4:
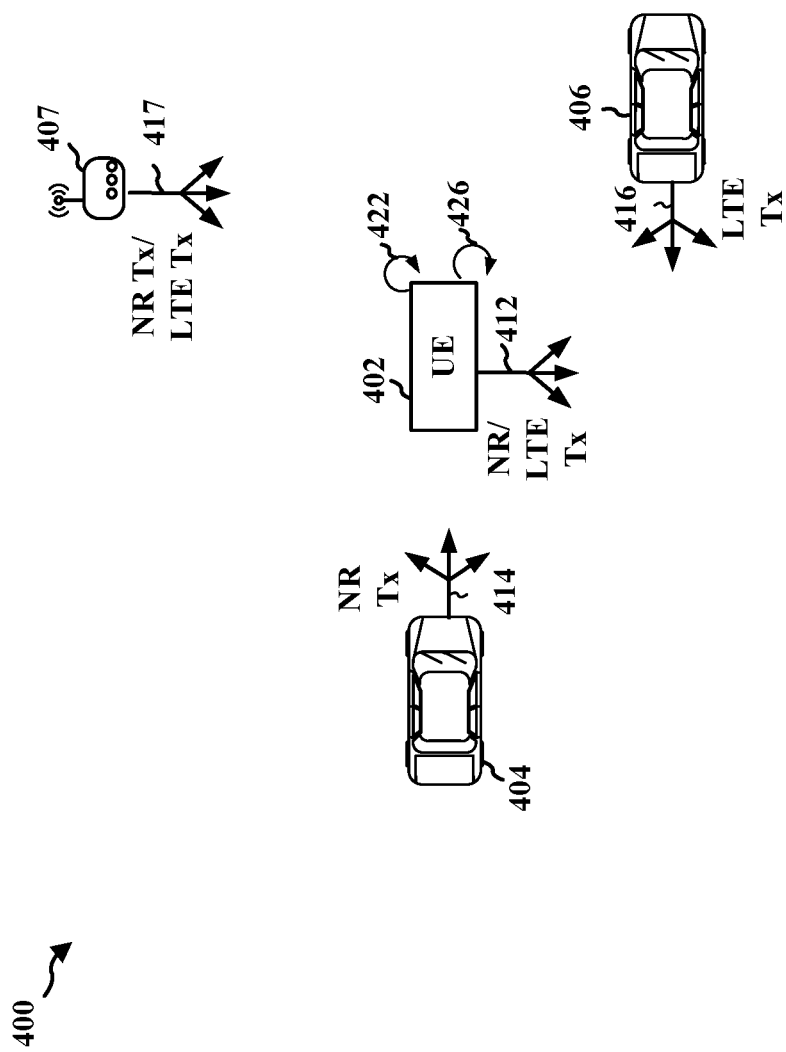
FIG. 4 illustrates communication from a device based on two RATs.

FIG. 4 illustrates an example of wireless communication 400 between devices based on D2D communication, such as V2X, V2V, etc. The devices involved in the communication may comprise any of UEs 402, 404, 406 and/or RSU 407. Although UEs 404 and 406 are illustrated as vehicles, the aspects described in connection with FIG. 4 may be applied for communication with any UE and is not limited to communication associated with vehicles. The UEs may communicate using different RATs. A single UE may be capable of communicating using different RATs. For example, UE 402 may communicate with UE 404 using NR V2X and may communicate with UE 406 using LTE V2X. Thus, UE 402 may comprise components for communicating based on a first RAT and components for communicating based on a second RAT.

V2X transmissions may comprise, e.g., a control channel and/or a corresponding data channel, that may be received directly by receiving devices, such as UEs 404 or 406 or RSU 407. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device.

UEs 402, 404, 406, and RSU 407 may each be capable of operating as both a transmitting device and a receiving device. Thus, while the devices are illustrated as transmitting communication 412, 414, 416, 417, the devices may also operate to receive such transmissions from other devices. The communication 412, 414, 416, 417 may be broadcast, multicast, or unicast to nearby devices.

UE 402 may transmit an NR V2X or LTE V2X communication 412, e.g., to a receiving device such as UE 404 using NR V2X or UE 406 using LTE V2X, and UE may also receive LTE V2X communication 416, 417 from UE 406. The communication 412 may at least partially overlap in time with reception of the LTE V2X communication 416, an NR V2X communication 414, or NR/LTE V2X communication 417. Transmitting the communication 412 in an overlapping manner with reception of the communication 414, 416, or 417 may cause reception problems for the communication 414, 416, or 417. Although described with an illustration showing communication between two UEs, such coexistence problems may also arise between a UE and a RSU 407 or other device communicating using NR V2X and/or LTE V2X. Although these examples are described for V2X communication based on NR and LTE, the aspects can be applied to other V2X, V2V, or other D2D communication based on two different RATs, and is not limited merely to LTE and NR as the two different RATs.

In another example, UE 402 may transmit the communication 412 that may be received by UE 406 and may receive NR V2X communication 414, 417. Transmission of the communication 412 may at least partially overlap in time with reception of the NR V2X communication 414. Transmitting the communication 412 in an overlapping manner with reception of the NR V2X communication 414 may cause problems in reception of the communication 414 and/or transmission of the communication 412.

NR V2X and LTE V2X may be configured on different frequency bands or on different frequency channels within the same frequency band. Thus, the two types of communication may use different portions of the frequency spectrum. The use of different frequency channels within the same frequency band may lead to half-duplex constraints that limit transmission/reception of one type of transmission from occurring at the same time as the other type of transmission. In order to ensure accurate communication, the present application provides aspects of coexistence management, e.g., that manage half duplex constraints between the two types of communication based on priorities of packet transmissions.

In a first example, coexistence issues may arise when transmission or reception of an LTE V2X packet, such as communication 412, would overlap in time with reception of an NR V2X communication 414, e.g., at UE 402. When a potential overlap is detected, the transmissions may be transmitted in a Time Division Multiplexed (TDM) manner in order to avoid having the transmissions overlap in time. As one example, UE 402 may avoid transmitting NR V2X transmissions during time resources used by UE 402 for LTE V2X communication.

In one example, LTE V2X communication and NR V2X communication may be configured in a semi-static manner and may be configured in different resource pools in frequency and/or time in order to avoid overlapping transmissions. Such a semi-static configuration using different resource pools may avoid overlapping transmissions without coordination between the LTE components and the NR components. Thus, overlapping transmission with one RAT and reception with another RAT can be avoided without requiring communication between LTE components and NR components to coordinate transmission/reception.

In another example, an overlap between LTE V2X communication and NR V2X communication may be avoided in a dynamic manner. For example, NR V2X transmissions may be scheduled to avoid resources that are scheduled for LTE V2X communication, e.g., in a dynamic manner. This may require communication between the LTE component(s) and NR component(s) in order for the NR components of device, e.g., UE 402, to be aware of the scheduled resources for the LTE V2X communication. NR V2X transmissions may be scheduled based on a knowledge of reserved Semi-Persistent Scheduling (SPS) resources for LTE V2X transmissions. The NR components of UE 402 may receive information indicating reservations for LTE V2X communication and may use the information to schedule NR V2X transmissions in a manner that avoids the scheduled resources for LTE V2X communication by LTE components of the UE 402.

Coexistence issues may arise, for example, when transmission of an NR V2X packet by the UE 402 would overlap in time with reception of a LTE V2X packet from the UE 406. In order to manage the coexistence of the V2X communication based on different RATs, the UE 402 may prioritize reception of the LTE V2X packet from the UE 406 over transmission of the NR V2X packet based on a relative priority of the packets or an interruption level for the NR V2X packet. Similarly, coexistence issues may arise when transmission of an LTE V2X packet by the UE 402 would overlap in time with reception of an NR V2X packet from the UE 404. In order to manage the coexistence of the V2X communication based on different RATs, the UE 402 may determine whether prioritize transmission of the LTE V2X packet over reception of the NR V2X packet based at least in part on a relative priority of the packets or an interruption level for reception of the NR V2X packet.

NR V2X transmissions may be associated with applications. The applications may be given a specific priority, e.g., a sidelink transmission priority (5QI), that is indicated by higher layers. Each priority, e.g., 5QI, may be mapped to a corresponding interruption level. Higher priority transmissions may be given a lower interruption level, and lower priority transmissions may be given a higher interruption level. The interruption levels may be configured via RRC. Thus, the interruption levels may be preconfigured, e.g., prior to the UE 402 determining a potential overlap in time between LTE communication and NR communication. As another example, the interruption levels may be predefined or otherwise specified. The interruption level may be associated with a time scale over which an interruption rate is calculated. The interruption level may indicate a percentage of packets and/or an amount of time. For example, the interruption level may indicate that a particular percentage of NR transmissions or reception of NR transmissions may be dropped over an period of time. As one example, an interruption level may indicate that 2% of NR transmissions for a particular 5QI may be dropped within an indicated period of time. Higher priority transmissions may have a lower percentage of NR transmission than 2% that could be dropped and/or may have a longer period of time over which the interruption rate is calculated. Lower priority transmissions may have a higher percentage of NR transmission than 2% that could be dropped and/or may have a shorter period of time over which the interruption rate is calculated.

In addition to an interruption level, the UE 402 may also determine whether to prioritize LTE communication or NR communication when an overlap is determined, based on a comparison of the priority levels of the two types of communication. A priority level of an LTE packet may be deduced using previous receptions of related LTE packets. For example, the overlapping LTE packet that will be received by the UE 402, in an overlapping manner with the planned NR transmission, may be based on a periodic transmission. The LTE communication may be based on reserved SPS resources. Thus, the UE may receive at least one prior LTE packet using the reserved SPS resources and may determine a priority level of the future LTE packet that will overlap with the NR transmission based on the at least one prior LTE packet.

LTE Rx and NR V2X Tx

In an example in which an NR transmission would overlap with LTE reception, the LTE reception may be prioritized over NR transmission up until an interruption level associated with the NR transmission is met. The interruption level may be indicated by higher layers. Therefore, the UE may prioritize the LTE reception and drop or modify the NR transmission in order to avoid an overlap in time with the LTE reception. When NR transmission(s) have been dropped/modified to the point that the interruption level is met, the UE may determine to transmit the NR transmission. Thus, the NR transmission may be prioritized, or chosen, over reception of the LTE transmission once the interruption level is reached.

The priority level of the LTE reception may also be considered in determining whether to prioritize the LTE reception over the NR transmission. If the NR transmission has a higher priority than the LTE reception, the UE may determine to transmit the NR transmission rather than prioritizing the LTE reception. However, if the LTE reception has a higher priority, then the UE may prioritize the LTE reception until the interruption level is met or exceeded. The UE may use a mapping between a priority level for the LTE transmission, e.g., a ProSe Per-Packet Priority (PPPP), and a priority level for the NR transmission, e.g., a 5QI, in order to determine whether reception of the LTE transmission has a higher priority than the NR transmission. Once the interruption level is exceeded, then the NR transmission may be prioritized regardless of the priority of the reception of the LTE transmission. The UE may continue to consider the priority of the LTE reception, even when the interruption level has been met. For example, if reception of an LTE packet has a higher priority level than transmission of an NR packet, once the interruption level has been exceeded, the UE 402 may perform resource re-selection. Thus, rather than drop the LTE packet, the UE may select new resources for transmission of the NR packet. If reception of the LTE packet has a lower priority, the UE may choose to not receive the LTE packet and may instead proceed with transmitting the NR packet.

Thus, in FIG. 4, the UE 402 may determine, at 422, whether to prioritize the NR transmission or the LTE reception opportunity based at least on an interruption level of the NR transmission.

The UE may use the interruption level for transmission of the NR packet to prioritize an overlapping reception of an LTE packet, which implicitly provides an interruption level for LTE reception.

LTE Tx and NR V2X Rx

In an example in which transmission of an LTE packet would overlap with reception of an NR V2X packet, the UE may drop the LTE transmission in favor of higher priority NR reception opportunities. In another example, the LTE transmission may be modified, e.g., the periodicity may be modified. NR reception may be interrupted in favor of higher priority LTE transmission(s). Thus, UE 402 may also determine whether to prioritize an overlapping LTE transmission or NR reception based on a comparison of the priority levels of the two types of communication.

A priority level of a future NR V2X reception may be predicted based on potential reservations made by prior NR V2X communication. Thus, the UE may receive at least one prior NR packet and may predict a priority level of a future NR packet that would overlap an LTE transmission based on the at least one prior NR packet. The UE may use a mapping between a priority level for the LTE transmission, e.g., a PPPP, and a priority level for the NR packet, e.g., a 5QI, in order to determine whether the LTE transmission has a higher priority than the NR reception opportunity.

Higher layers may configure an interruption rate corresponding to the NR reception opportunity, e.g., an interruption rate that can be tolerated at a given time. The interruption rate may include a time frame for evaluating the interruption rate. The interruption rate may be dynamically changed by upper layers, e.g., depending on the application(s) running at the UE, a priority of the packets being received by the UE, a priority of packets received from other UEs at a given time, etc. Thus, the NR reception may be interrupted or stopped, and the LTE transmission may be prioritized, up until the interruption level is met.

While upper layers of the UE may configure the interruption rate, lower layers may manage the LTE transmission and NR reception (and similarly the NR transmission and LTE reception) in a manner that ensures the interruption rate is satisfied. For example, LTE transmissions may be skipped or modified when the interruption level/interruption rate has been exceeded.

Thus, at 426, the UE 402 may determine whether to prioritize the LTE transmission or the NR reception opportunity based on a comparison of the priority levels for the two RATs and based on an interruption level for the NR reception.

Thus, configurations of the interruption level for the NR communication, whether transmission or reception, can be used to control an amount of LTE/NR interruptions that occur. The interruption of the LTE reception can be implicitly controlled by setting a maximum interruption rate for an NR transmission. The configuration of the interruption level may be set per priority level for a corresponding application. As well, the interruption of NR reception may be controlled through setting an interruption rate by higher layers. These aspects may be controlled without defining LTE interruption rates. Higher layers may determine interruption rates, e.g., based on particular applications, based on packets being received, based on an amount of NR interruption that can be tolerated at a given time, etc.

Figure 5:
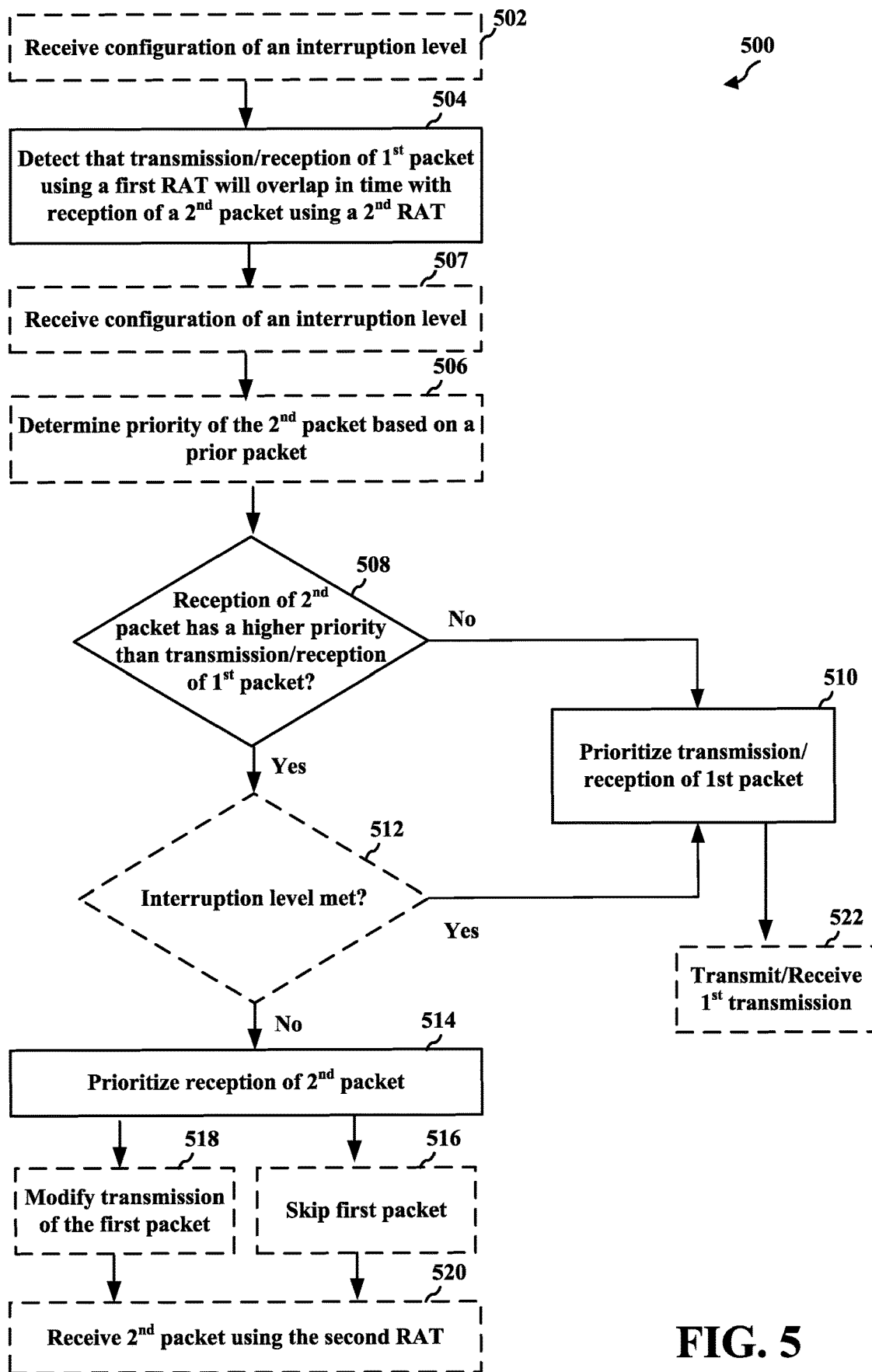
FIG. 5 is a flowchart of a method of wireless communication.

FIG. 5 is a flowchart 500 of a method of wireless communication. The method may be performed by a transmitting device/receiving device, e.g., (UE 104b, 402, device 350, RSU 107, 407, base station 102, 180, the apparatus 602, 602'; the processing system 714, which may include memory and which may be an entire UE or a component of a UE). The device may be capable of transmitting and receiving based on two different RATs. The apparatus may transmit or receive D2D communication, such as V2X, V2V, etc., directly with another device, e.g., directly with another UE, RSU, or other device communicating based on V2X, V2V, or other D2D communication. The method addresses transmission and reception problems that may occur at a device that communicates using multiple RATs. The method provides for improved coexistence through the use of relative priority levels and/or an interruption level to determine whether to prioritize transmission using the first RAT or reception using the second RAT.

At 504, the device detects that transmission or reception of a first packet at the device using a first RAT will overlap in time with reception of a second packet at the device using a second RAT. The detection may be performed, e.g., by the overlap component 612 of the apparatus 602 in FIG. 6. The first packet may comprise a V2X packet for transmission/reception using the first RAT, and the second packet may comprise a V2X packet for reception using the second RAT. In one example, the first RAT may comprise NR, and the second RAT may comprise LTE, e.g., the device may determine whether to prioritize transmission or reception of an NR V2X packet or reception of an LTE V2X packet based on an interruption level for the NR packet. In another example, the first packet may comprise an LTE V2X packet and the second packet may comprise an NR V2X packet, e.g., the device may determine whether to prioritize an LTE V2X packet or reception of the NR V2X packet based on an interruption level for the NR packet.

As illustrated at 508, the device may determine whether to prioritize the reception of the second packet over transmission/reception of the first packet based at least in part on a relative priority of the first packet and the second packet. The determination may be performed, e.g., by the prioritization component 614 of the apparatus 602 in FIG. 6. For example, the device may prioritize the first or second packet based on a comparison of a first priority level for the first packet and a second priority level for the second packet.

In order to make the determination about the two priority levels, the UE may first determine, at 506, a priority level of the second packet. The determination may be performed, e.g., by the priority component 618 of the apparatus 602 in FIG. 6. The UE may determine the priority level of the second packet, at 506, based on prior reception of prior packet(s) using the second RAT. The reception of the second packet may be based on reserved SPS of resources.

The UE may transmit or receive the first packet when the first priority level for the first transmission is higher than the second priority level of the second packet, at 522. The transmission or reception may be performed, e.g., by the first RAT component 608, the reception component 604, and/or the transmission component 606 of the apparatus 602 in FIG. 6.

When the first priority level of the first packet is lower than the second priority level of the second packet, the device may skip transmission/reception of the first packet, as illustrated at 516. For example, the first RAT component 608 and/or the skip component 620 of the apparatus 602 in FIG. 6 may cause the apparatus to skip the transmission/reception of the first packet.

When the first priority level of the first packet is lower than the second priority level of the second packet, the device may modify a transmission using the first RAT, as illustrated at 518. For example, the first RAT component 608 and/or the modify component 622 of the apparatus 602 in FIG. 6 may modify transmission of the first packet. The device may modify one or more transmissions using the first RAT. Modifying the transmission using the first RAT may comprise modifying a periodicity of the transmission using the first RAT.

Prioritizing transmission/reception of the first packet over the reception of the second packet, e.g., at 510, may include performing resource reselection for the first packet when the interruption level is met so that interruption of the first packet is avoided. The resource reselection may be performed, e.g. by the modify component 622 and/or the first RAT component 608 of the apparatus 602 in FIG. 6. Prioritizing transmission/reception of the first packet over the reception of the second packet, at 510, may include transmitting or receiving the first packet when the interruption level is met.

In an example in which the first packet may comprise an LTE packet, such as an LTE V2X packet, and the second packet may comprise an NR packet, such as an NR V2X packet. In some examples, the priority level of the second packet may be based on the interruption level for the reception of the second packet. At 507, the device may determine the interruption level for the second packet associated with the application may be based on at least one prior packet received using the second RAT, the at least one prior packet being associated with the application. The interruption level may be determined, e.g., by the interruption level component 616 of the apparatus 602 in FIG. 6.

The device may receive the second packet, at 520, when the second packet has a higher priority level and/or the interruption level for the second packet has been met. The reception may be performed, e.g., by the reception component 604 and/or the second RAT component 610 of the apparatus 602 in FIG. 6. For example, the reception of the second packet may be prioritized over transmission/reception of the first packet until the interruption level if the second packet has a higher priority level than the first packet. If the second packet does not have a higher priority level, e.g., as determined at 508, the device may prioritize transmission/reception of the first packet, at 510.

For example, as illustrated at 512, the device may determine whether to prioritize the first packet or the second packet based at least on an interruption level of the first packet or the second packet. The determination or prioritization may be performed, e.g., by the prioritization component 614 of the apparatus 602 in FIG. 6. The device may prioritize the reception of the second packet over transmission/reception of the first packet, at 514, when the interruption level is not met. When the interruption level is met, the device may prioritize transmission/reception of the first packet over the reception of the second packet, at 510.

The determination about whether to prioritize the first packet or reception of the second packet may include determining an interruption level for the first packet or the second packet and further determining whether the interruption level has been met. The interruption level may be based on a priority level of an application associated with the first packet. A higher priority application may have a lower interruption level and a lower priority application may have a higher interruption level. As one example, the device may receive, at 502, a configuration of the interruption level for the application prior to determining that transmission/reception of the first packet will overlap in time with the reception of the second packet. The configuration may be received, e.g., by the interruption level component 616 of the apparatus 602 in FIG. 6. As another example, the interruption level may be based on a defined mapping to a priority level. The interruption level may correspond to an amount of time over which an interruption rate is calculated.

Figure 6:
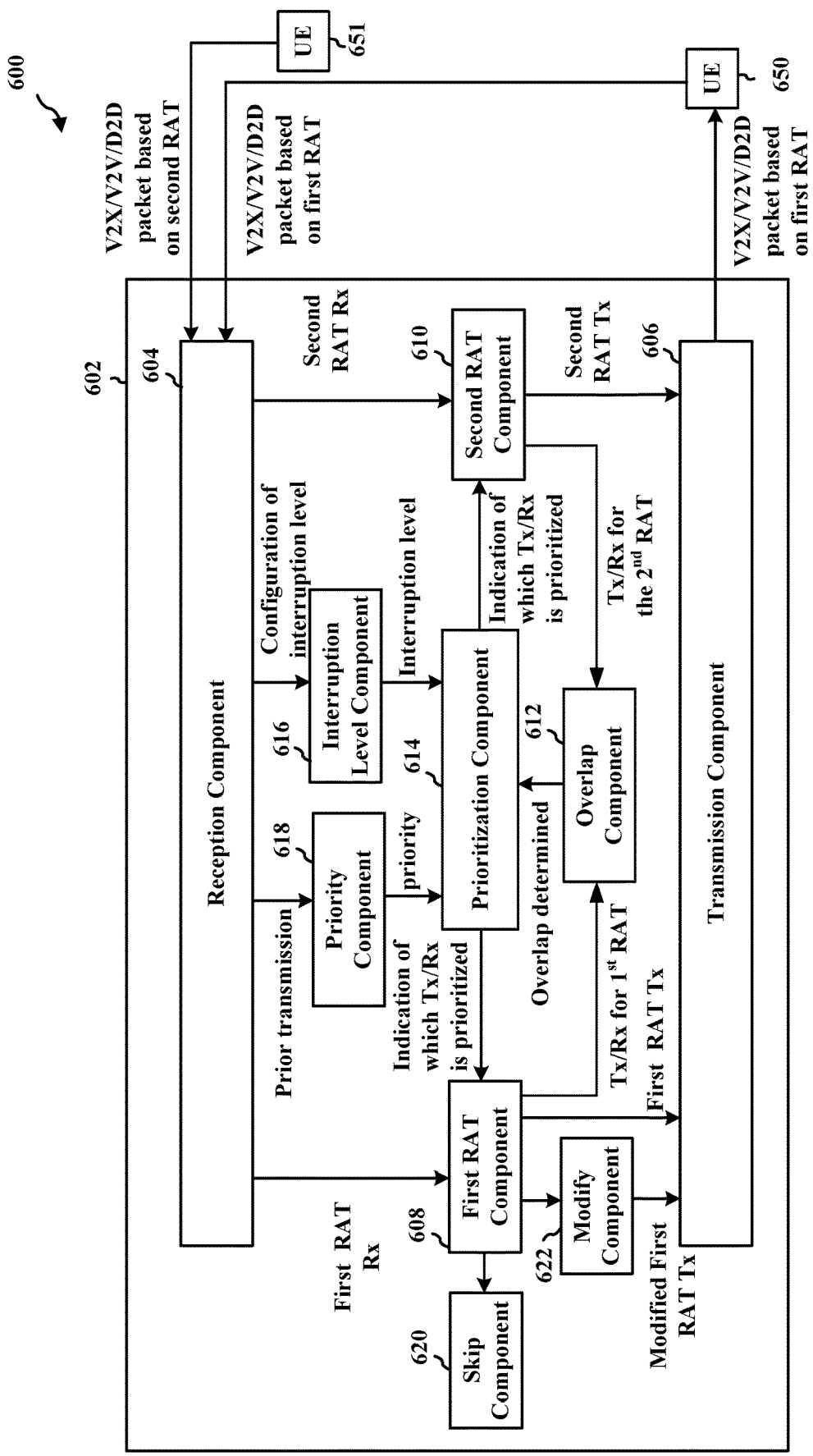
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus 602 may be a device, e.g., a UE, an RSU, or a base station, that may be capable of transmitting and receiving based on two different RATs. In an example, the apparatus 602 may comprise a UE or a component of a UE. In another example, the apparatus 602 ma comprise an RSU or a component of an RSU. The apparatus comprises a reception component 604 configured to receive D2D communication, e.g., V2X, V2V, etc., directly from a transmitting device, e.g., device 651 or 650. The apparatus 602 includes a transmission component 606 configured to transmit communication to device 650. Although the devices 650 and 651 are illustrated using the example of a UE, in other examples, the devices 650 or 651 may comprise an RSU or other device communicating based on D2D communication, such as V2X, V2V, etc. The apparatus 602 includes a first RAT component 608 that is configured to receive communication and transmit communication with device 650, e.g., based on the first RAT. The apparatus includes a second RAT component 610 that is configured to receive communication and transmit communication with device 651, e.g., based on the second RAT. The apparatus includes an overlap component 612 configured to detect that transmission or reception of a first packet from the apparatus 602 using a first RAT will overlap in time with reception of a second packet at the apparatus 602 using a second RAT, e.g., as described in connection with 504 in FIG. 5. The first RAT may comprise LTE and the second RAT may comprise NR, for example. In other examples, the first RAT may comprise NR and the second RAT may comprise LTE. The apparatus 602 comprises a prioritization component 614 that is configured to prioritize the first packet or the second packet based at least one a relative priority of the first packet and the second packet. The prioritization component 614 may be configured to prioritize the first packet or the second packet based at least on an interruption level of the first packet or second packet. For example, the apparatus may prioritize the reception of the second packet over transmission of the first packet when the interruption level is not met and may prioritize the first packet over the reception of the second packet when the interruption level is met, e.g., as described in connection with 510, 514. For example, the prioritization component 614 may prioritize reception of the second packet when the interruption level is not met and prioritize the first packet over reception of the second packet when the interruption level is met, e.g., as described in connection with 510 and 514 in FIG. 5. The reception of the second packet may be prioritized over transmission of the first packet to the interruption level if the second packet has a higher priority level than the first packet. Thus, the apparatus 602 may include a priority component 618 configured to determine a priority level of the second packet based on reception of at least one prior packet using the second RAT, e.g., as described in connection with 506 in FIG. 5. The first RAT component 608 may be configured to transmit the first packet, via the transmission component 606, when a first priority level for the first packet is higher than a second priority level of the second packet. The apparatus 602 may include an interruption level component 616 configured to determine or otherwise identify the interruption level of a particular packet, e.g., as described in connection with 512 in FIG. 5. For example, the interruption level component 616 may receive a configuration of an interruption level based on an application that is associated with the packet, e.g., as described in connection with 502. The apparatus 602 may comprise a skip component 620 configured to skip the first packet when a first priority level of the first packet is lower than a second priority level of the second packet. The apparatus 602 may comprise a modify component 622 configured to modify a transmission using the first RAT when a first priority level of the first packet is lower than a second priority level of the second packet. The modify component 622 may be configured to perform resource reselection for the first packet when the second packet is prioritized.

The apparatus 602 may include additional components that perform each of the blocks of the algorithm in the aforementioned flowchart of FIG. 5. As such, each block in the aforementioned flowcharts of flowchart of FIG. 5 may be performed by a component and the apparatus 602 may include one or more of those components, such as any of components 604, 606, 608, 610, 612, 614, 616, 618, 620, 622, etc. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
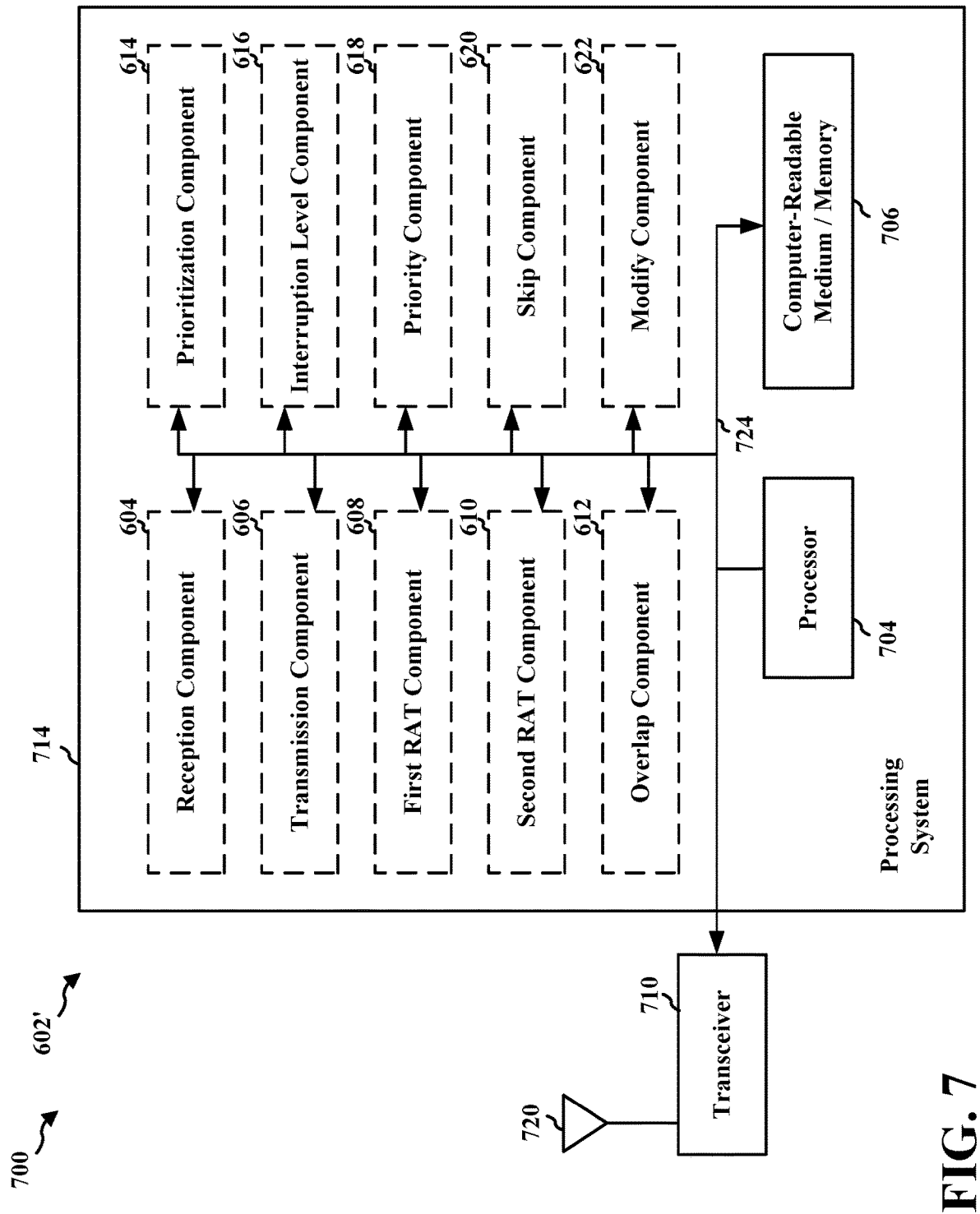
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, 620, 622, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 606, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618, 620, 622. The components may be software components running in the processor 704, resident/stored in the computer readable medium/memory 706, one or more hardware components coupled to the processor 704, or some combination thereof. The processing system 714 may be a component of the device 310 or the device 350 and may include the memory 376, 360 and/or at least one of the TX processor 316, 368, the RX processor 370, 356, and the controller/processor 375, 359. Alternately, the processing system 714 may comprise the entire device 310 or 350. For example, the processing system 714 may comprise an entire UE or an entire RSU.

In one configuration, the apparatus 602/602' for wireless communication includes means for detecting that transmission or reception of a first packet at a device using a first RAT will overlap in time with reception of a second packet at the device using a second RAT (e.g., at least overlap component 612); means for prioritizing the first packet or the second packet based at least on a relative priority of the first packet and the second packet (e.g., at least prioritization component 614); means for prioritizing the first packet or the second packet based on an interruption level of the first packet or the second packet (e.g., at least prioritization component 614); means for determining a priority level of the second packet based on reception of at least one prior packet using the second RAT (e.g., priority component 618); means for transmitting or receiving the first packet, e.g., when a first priority level for the first packet is higher than a second priority level of the second packet (e.g., first RAT component 608); means for skipping transmission or reception of the first packet when a first priority level of the first packet is lower than a second priority level of the second packet (e.g., at least skip component 620); means for modifying a transmission using the first RAT when a first priority level of the first packet is lower than a second priority level of the second packet (e.g., at least modify component 622); means for performing resource reselection for the first packet when the second packet is prioritized (e.g., at least modify component 622); means for receiving a configuration of an interruption level for an application associated with the first packet (e.g., at least interruption level component 616). The aforementioned means may be one or more of the aforementioned components of the apparatus 602 and/or the processing system 714 of the apparatus 602' configured to perform the functions recited by the aforementioned means. As described supra, the processing system 714 may include the TX processor 316, 368, the RX processor 370, 356, and the controller/processor 375, 359. As such, in one configuration, the aforementioned means may comprise the TX processor 316, 368, the RX processor 370, 356, and the controller/processor 375, 359 configured to perform the functions recited by the aforementioned means.

The following examples are illustrative only and aspects thereof may be combined with aspects of other examples or teaching described herein, without limitation.

Example 1 is a method of wireless communication, comprising: detecting that a transmission or reception of a first packet at a device using a first RAT will overlap in time with reception of a second packet at the device using a second RAT; and prioritizing the first packet or the second packet based at least on a relative priority of the first packet and the second packet.

In Example 2, the method of Example 1 further includes that the reception of the second packet is prioritized over transmission or reception of the first packet if the second packet has a higher priority level than the first packet.

In Example 3, the method of Example 1 or Example 2 further includes determining a priority level of the second packet based on a prior reception of at least one prior packet using the second RAT.

In Example 4, the method of any of Examples 1-3 further includes that the reception of the second packet is based on reserved semi-persistent scheduling of resources.

In Example 5, the method of any of Examples 1-4 further includes transmitting or receiving the first packet when the first packet has a higher priority level than the second packet.

In Example 6, the method of any of Examples 1-5 further includes performing resource reselection for the first packet when the second packet is prioritized.

In Example 7, the method of any of Examples 1-6 further includes skipping transmission or reception of the first packet when the first packet has a lower priority level than the second packet.

In Example 8, the method of any of Examples 1-7 further includes modifying a transmission using the first RAT when the first packet has a lower priority than the second packet.

In Example 9, the method of any of Examples 1-8 further includes modifying the transmission using the first RAT comprises modifying a periodicity of the transmission using the first RAT.

In Example 10, the method of any of Examples 1-9 further includes that the first packet comprises a first V2X packet and the second packet comprises a second V2X packet.

In Example 11, the method of any of Examples 1-10 further includes that the first RAT comprises NR, and wherein the second RAT comprises LTE.

In Example 12, the method of any of Examples 1-11 further includes that an interruption level is based on a priority level of an application associated with the first packet.

In Example 13, the method of any of Examples 1-12 further includes that the first packet or the second packet is prioritized further based on the interruption level of the first packet.

In Example 14, the method of any of Examples 1-13 further includes that a higher priority application has a lower interruption level and a lower priority application has a higher interruption level.

In Example 15, the method of any of Examples 1-14 further includes receiving a configuration of the interruption level for the application prior to determining that the first packet will overlap in time with the reception of the second packet.

In Example 16, the method of any of Examples 1-15 further includes that the interruption level is based on a defined mapping to the priority level.

In Example 17, the method of any of Examples 1-16 further includes that the interruption level corresponds to an amount of time over which an interruption rate is calculated.

In Example 18, the method of any of Examples 1-17 further includes that a second application is associated with the second packet, the method further comprising determining the interruption level for the second packet associated with the second application based on at least one prior transmission received using the second RAT, the at least one prior transmission being associated with the second application.

Example 19 is a device including one or more processors and one or more memories in electronic communication with the one or more processors storing instructions executable by the one or more processors to cause the device to implement a method as in any of Examples 1-18.

Example 20 is a system or apparatus including means for implementing a method or realizing an apparatus as in any of Examples 1-18.

Example 21 is a non-transitory computer readable medium storing instructions executable by one or more processors to cause the one or more processors to implement a method as in any of Examples 1-18.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first wireless device based on a first radio access technology (RAT) and a second RAT, comprising:
   memory; and
   one or more processors coupled to the memory, the one or more processors configured to cause the first wireless device to:
      receive a prior sidelink transmission from a second wireless device using the second RAT;
      determine a priority level of a second sidelink transmission for reception using the second RAT based on a prior reception of the prior sidelink transmission, from the second wireless device, using the second RAT, the priority level being based, at least in part, on a reservation made by the prior sidelink transmission; and
      transmit or receive a higher priority sidelink transmission having a higher priority level among a first sidelink transmission using the first RAT and the second sidelink transmission using the second RAT in response to a detection that transmission of the first sidelink transmission using the first RAT will overlap in time with reception of the second sidelink transmission using the second RAT.

2. The apparatus of claim 1, wherein the first sidelink transmission comprises a first channel using the first RAT and the second sidelink transmission comprises a second channel using the second RAT.

3. The apparatus of claim 2, wherein the first channel comprises a first control channel or a first data channel, and the second channel comprises a second control channel or a second data channel.

4. The apparatus of claim 1, the one or more processors further configured to cause the first wireless device to:
   receive the second sidelink transmission instead of the transmission of the first sidelink transmission based on the priority level determined for the second sidelink transmission having the higher priority level than the first sidelink transmission.

5. The apparatus of claim 1, the one or more processors further configured to cause the first wireless device to:
   transmit the first sidelink transmission based on the first sidelink transmission having the higher priority level than the priority level determined for the second sidelink transmission.

6. The apparatus of claim 1, the one or more processors further configured to cause the first wireless device to:
   perform resource reselection for the first sidelink transmission based on the second sidelink transmission being the higher priority sidelink transmission.

7. The apparatus of claim 1, the one or more processors further configured to cause the first wireless device to:
   modify the first sidelink transmission using the first RAT based on the first sidelink transmission having a lower priority than the second sidelink transmission.

8. The apparatus of claim 7, the one or more processors further configured to cause the first wireless device to:
   modify the first sidelink transmission by modification of a periodicity of the first sidelink transmission using the first RAT.

9. The apparatus of claim 1, the first RAT comprising New Radio (NR) or Long Term Evolution (LTE) and the second RAT comprising a different RAT of the NR or the LTE.

10. The apparatus of claim 1, the one or more processors further configured to cause the first wireless device to:
   prioritize the first sidelink transmission or the second sidelink transmission further based on an interruption level.

11. The apparatus of claim 1, the priority level of at least one of the first sidelink transmission or the second sidelink transmission being based, at least in part, on an indication from a higher layer.

12. The apparatus of claim 1, transmission or reception of the higher priority sidelink transmission including reception of the second sidelink transmission based on the second sidelink transmission being the higher priority sidelink transmission, the one or more processors further configured to cause the first wireless device to:
   skip the transmission of the first sidelink transmission.

13. The apparatus of claim 1, wherein the first sidelink transmission comprises a first data packet and the second sidelink transmission comprises a second data packet.

14. The apparatus of claim 1, the first sidelink transmission comprising a first Vehicle-to-everything (V2X) transmission and the second sidelink transmission comprising a second V2X transmission.

15. A method of wireless communication at a first wireless device using a first radio access technology (RAT) and a second RAT, comprising:
   receiving a prior sidelink transmission from a second wireless device using the second RAT;
   determining a priority level of a second sidelink transmission for reception using the second RAT based on a prior reception of the prior sidelink transmission, from the second wireless device, using the second RAT, the priority level being based, at least in part, on a reservation made by the prior sidelink transmission; and
   transmitting or receiving a higher priority sidelink transmission having a higher priority level among a first sidelink transmission using the first RAT and the second sidelink transmission using the second RAT in response to detecting that transmission of the first sidelink transmission using the first RAT will overlap in time with reception of the second sidelink transmission using the second RAT.

16. An apparatus for wireless communication at a first wireless device based on a first radio access technology (RAT) and a second RAT, comprising:
   memory; and
   one or more processors coupled to the memory, the one or more processors configured to cause the first wireless device to:
      receive a prior sidelink transmission from a second wireless device using the second RAT;
      determine a priority level of a second sidelink transmission for reception using the second RAT based on a prior reception of the prior sidelink transmission, from the second wireless device, using the second RAT, the priority level being based, at least in part, on a reservation made by the prior sidelink transmission; and receive a higher priority sidelink transmission having a higher priority level among a first sidelink transmission using the first RAT and the second sidelink transmission using the second RAT in response to a detection that reception of the first sidelink transmission using the first RAT will overlap in time with reception of the second sidelink transmission using the second RAT.

17. The apparatus of claim 16, wherein the first sidelink transmission comprises a first channel using the first RAT and the second sidelink transmission comprises a second channel using the second RAT.

18. The apparatus of claim 17, wherein the first channel comprises a first control channel or a first data channel, and the second channel comprises a second control channel or a second data channel.

19. The apparatus of claim 16, the one or more processors further configured to cause the first wireless device to:
receive the second sidelink transmission instead of the reception of the first sidelink transmission based on the priority level determined for the second sidelink transmission having the higher priority level than the first sidelink transmission.

20. The apparatus of claim 16, the reception of the second sidelink transmission being based on reserved semi-persistent scheduling of resources.

21. The apparatus of claim 16, the one or more processors further configured to cause the first wireless device to receive the first sidelink transmission based on the first sidelink transmission having the higher priority level than the second sidelink transmission.

22. The apparatus of claim 16, the one or more processors further configured to cause the first wireless device to skip the reception of the first sidelink transmission based on the first sidelink transmission having a lower priority level than the second sidelink transmission.

23. The apparatus of claim 16, the first RAT comprising New Radio (NR) or Long Term Evolution (LTE), and the second RAT comprising a different RAT of the NR or the LTE.

24. The apparatus of claim 16, the priority level of at least one of the first sidelink transmission or the second sidelink transmission being based, at least in part, on an indication from a higher layer.

25. The apparatus of claim 16, wherein to receive the higher priority sidelink transmission, the one or more processors are further configured to cause the first wireless device to:
receive the second sidelink transmission based on the second sidelink transmission being the higher priority sidelink transmission, and
skip the reception of the first sidelink transmission.

26. The apparatus of claim 16, wherein the first sidelink transmission comprises a first data packet and the second sidelink transmission comprises a second data packet.

27. The apparatus of claim 16, the first sidelink transmission comprising a first Vehicle-to-everything (V2X) transmission and the second sidelink transmission comprising a second V2X transmission.

28. A method of wireless communication at a first wireless device using a first radio access technology (RAT) and a second RAT, comprising:
receiving a prior sidelink transmission from a second wireless device using the second RAT;

determining a priority level of a second sidelink transmission for reception using the second RAT based on a prior reception of the prior sidelink transmission, from the second wireless device, using the second RAT, the priority level being based, at least in part, on a reservation made by the prior sidelink transmission; and receiving a higher priority sidelink transmission having a higher priority level among a first sidelink transmission using the first RAT and the second sidelink transmission using the second RAT in response to detecting that reception of the first sidelink transmission using the first RAT will overlap in time with reception of the second sidelink transmission using the second RAT.

29. The method of claim 15, wherein the first sidelink transmission comprises a first channel using the first RAT and the second sidelink transmission comprises a second channel using the second RAT.

30. The method of claim 15, wherein transmitting or receiving the higher priority sidelink transmission includes:
receiving the second sidelink transmission instead of the transmission of the first sidelink transmission based on the priority level determined for the second sidelink transmission having the higher priority level than the first sidelink transmission.

31. The method of claim 15, wherein transmitting or receiving the higher priority sidelink transmission includes:
transmitting the first sidelink transmission based on the first sidelink transmission having the higher priority level than the priority level determined for the second sidelink transmission.

32. The method of claim 15, the first RAT comprising New Radio (NR) or Long Term Evolution (LTE) and the second RAT comprising a different RAT of the NR or the LTE.

33. The method of claim 28, wherein the first sidelink transmission comprises a first channel using the first RAT and the second sidelink transmission comprises a second channel using the second RAT.

34. The method of claim 28, wherein receiving the higher priority sidelink transmission includes:
receiving the second sidelink transmission instead of receiving the first sidelink transmission based on the priority level determined for the second sidelink transmission having the higher priority level than the first sidelink transmission.

35. The method of claim 28, wherein receiving the higher priority sidelink transmission includes:
receiving the first sidelink transmission based on the first sidelink transmission having the higher priority level than the second sidelink transmission.

36. The method of claim 28, the first RAT comprising New Radio (NR) or Long Term Evolution (LTE), and the second RAT comprising a different RAT of the NR or the LTE.

37. The apparatus of claim 16, wherein the one or more processors are, individually or in combination, configured to cause the first wireless device to receive the prior sidelink transmission, determine the priority level of the second sidelink transmission, and transmit or receive the higher priority sidelink transmission.

38. The apparatus of claim 16, wherein the one or more processors are, individually or in combination, configured to cause the first wireless device to receive the prior sidelink transmission, determine the priority level of the second sidelink transmission, and receive the higher priority sidelink transmission.

39. An apparatus for wireless communication at a first wireless device using a first radio access technology (RAT) and a second RAT, comprising:
- means for receiving a prior sidelink transmission from a second wireless device using the second RAT;
- means for determining a priority level of a second sidelink transmission for reception using the second RAT based on a prior reception of the prior sidelink transmission, from the second wireless device, using the second RAT, the priority level being based, at least in part, on a reservation made by the prior sidelink transmission; and
- means for transmitting or receiving a higher priority sidelink transmission having a higher priority level among a first sidelink transmission using the first RAT and the second sidelink transmission using the second RAT in response to detecting that transmission of the first sidelink transmission using the first RAT will overlap in time with reception of the second sidelink transmission using the second RAT.

40. The apparatus of claim 39, wherein the first sidelink transmission comprises a first channel using the first RAT and the second sidelink transmission comprises a second channel using the second RAT.

41. The apparatus of claim 39, wherein the means for transmitting or receiving the higher priority sidelink transmission is configured to receive the second sidelink transmission instead of the transmission of the first sidelink transmission based on the priority level determined for the second sidelink transmission having the higher priority level than the first sidelink transmission.

42. The apparatus of claim 39, wherein the means for transmitting or receiving the higher priority sidelink transmission is configured to transmit the first sidelink transmission based on the first sidelink transmission having the higher priority level than the priority level determined for the second sidelink transmission.

43. The apparatus of claim 39, the first RAT comprising New Radio (NR) or Long Term Evolution (LTE) and the second RAT comprising a different RAT of the NR or the LTE.

44. An apparatus for wireless communication at a first wireless device using a first radio access technology (RAT) and a second RAT, comprising:
- means for receiving a prior sidelink transmission from a second wireless device using the second RAT;
- means for determining a priority level of a second sidelink transmission for reception using the second RAT based on a prior reception of the prior sidelink transmission, from the second wireless device, using the second RAT, the priority level being based, at least in part, on a reservation made by the prior sidelink transmission; and
- means for receiving a higher priority sidelink transmission having a higher priority level among a first sidelink transmission using the first RAT and the second sidelink transmission using the second RAT in response to detecting that reception of the first sidelink transmission using the first RAT will overlap in time with reception of the second sidelink transmission using the second RAT.

45. The apparatus of claim 44, wherein the first sidelink transmission comprises a first channel using the first RAT and the second sidelink transmission comprises a second channel using the second RAT.

46. The apparatus of claim 44, wherein the means for receiving the higher priority sidelink transmission is configured to receive the second sidelink transmission instead of receiving the first sidelink transmission based on the priority level determined for the second sidelink transmission having the higher priority level than the first sidelink transmission.

47. The apparatus of claim 44, wherein the means for receiving the higher priority sidelink transmission is configured to receive the first sidelink transmission based on the first sidelink transmission having the higher priority level than the second sidelink transmission.

48. The apparatus of claim 44, the first RAT comprising New Radio (NR) or Long Term Evolution (LTE), and the second RAT comprising a different RAT of the NR or the LTE.

49. A non-transitory computer-readable storage medium storing computer executable code for wireless communication at a first wireless device based on a first radio access technology (RAT) and a second RAT, the code when executed by one or more processors causes the first wireless device to:
- receive a prior sidelink transmission from a second wireless device using the second RAT;
- determine a priority level of a second sidelink transmission for reception using the second RAT based on a prior reception of the prior sidelink transmission, from the second wireless device, using the second RAT, the priority level being based, at least in part, on a reservation made by the prior sidelink transmission; and
- transmit or receive a higher priority sidelink transmission having a higher priority level among a first sidelink transmission using the first RAT and the second sidelink transmission using the second RAT in response to detecting that transmission of the first sidelink transmission using the first RAT will overlap in time with reception of the second sidelink transmission using the second RAT.

50. The computer-readable storage medium of claim 49, wherein the first sidelink transmission comprises a first channel using the first RAT and the second sidelink transmission comprises a second channel using the second RAT.

51. The computer-readable storage medium of claim 49, wherein the code, when executed by the one or more processors, causes the first wireless device to receive the second sidelink transmission instead of the transmission of the first sidelink transmission based on the priority level determined for the second sidelink transmission having the higher priority level than the first sidelink transmission.

52. The computer-readable storage medium of claim 49, wherein the code, when executed by the one or more processors, causes the first wireless device to transmit the first sidelink transmission based on the first sidelink transmission having the higher priority level than the priority level determined for the second sidelink transmission.

53. The computer-readable storage medium of claim 49, the first RAT comprising New Radio (NR) or Long Term Evolution (LTE) and the second RAT comprising a different RAT of the NR or the LTE.

54. A non-transitory computer-readable storage medium storing computer executable code for wireless communication at a first wireless device based on a first radio access technology (RAT) and a second RAT, the code when executed by one or more processors causes the first wireless device to:
- receive a prior sidelink transmission from a second wireless device using the second RAT;
- determine a priority level of a second sidelink transmission for reception using the second RAT based on a prior reception of the prior sidelink transmission, from the second wireless device, using the second RAT, the priority level being based, at least in part, on a reservation made by the prior sidelink transmission; and receive a higher priority sidelink transmission having a higher priority level among a first sidelink transmission using the first RAT and the second sidelink transmission using the second RAT in response to detecting that reception of the first sidelink transmission using the first RAT will overlap in time with reception of the second sidelink transmission using the second RAT.

55. The computer-readable storage medium of claim 54, wherein the first sidelink transmission comprises a first channel using the first RAT and the second sidelink transmission comprises a second channel using the second RAT.

56. The computer-readable storage medium of claim 54, wherein the code, when executed by the one or more processors, causes the first wireless device to receive the second sidelink transmission instead of receiving the first sidelink transmission based on the priority level determined for the second sidelink transmission having the higher priority level than the first sidelink transmission.

57. The computer-readable storage medium of claim 54, wherein the code, when executed by the one or more processors, causes the first wireless device to receive the first sidelink transmission based on the first sidelink transmission having the higher priority level than the second sidelink transmission.

58. The computer-readable storage medium of claim 54, the first RAT comprising New Radio (NR) or Long Term Evolution (LTE), and the second RAT comprising a different RAT of the NR or the LTE.

59. The apparatus of claim 1, wherein the reservation reserves sidelink resources for the second sidelink transmission, and wherein the one or more processors are further configured to cause the first wireless device to determine the priority level of the second sidelink transmission for reception using the second RAT based, at least in part, on the reservation of the sidelink resources for the second sidelink transmission made by the prior sidelink transmission.

60. The apparatus of claim 16, wherein the reservation reserves sidelink resources for the second sidelink transmission, and wherein the one or more processors are further configured to cause the first wireless device to determine the priority level of the second sidelink transmission for reception using the second RAT based, at least in part, on the reservation of the sidelink resources for the second sidelink transmission made by the prior sidelink transmission.

61. The apparatus of claim 1, wherein the first wireless device is a user equipment (UE) or a roadside unit (RSU).

62. The apparatus of claim 16, wherein the first wireless device is a user equipment (UE) or a road side unit (RSU).

63. The method of claim 15, wherein the reservation reserves sidelink resources for the second sidelink transmission, and wherein determining the priority level of the second sidelink transmission for reception using the second RAT is based, at least in part, on the reservation of the sidelink resources for the second sidelink transmission made by the prior sidelink transmission.

64. The method of claim 28, wherein the reservation reserves sidelink resources for the second sidelink transmission, and wherein determining the priority level of the second sidelink transmission for reception using the second RAT is based, at least in part, on the reservation of the sidelink resources for the second sidelink transmission made by the prior sidelink transmission.

65. The apparatus of claim 39, wherein the reservation reserves sidelink resources for the second sidelink transmission, and wherein the means for determining the priority level of the second sidelink transmission for reception using the second RAT is configured to determine the priority level based, at least in part, on the reservation of the sidelink resources for the second sidelink transmission made by the prior sidelink transmission.

66. The apparatus of claim 44, wherein the reservation reserves sidelink resources for the second sidelink transmission, and wherein the means for determining the priority level of the second sidelink transmission for reception using the second RAT is configured to determine the priority level based, at least in part, on the reservation of the sidelink resources for the second sidelink transmission made by the prior sidelink transmission.

67. The computer-readable storage medium of claim 49, wherein the reservation reserves sidelink resources for the second sidelink transmission, and wherein the code, when executed by the one or more processors, causes the first wireless device to determine the priority level of the second sidelink transmission for reception using the second RAT based, at least in part, on the reservation of the sidelink resources for the second sidelink transmission made by the prior sidelink transmission.

68. The computer-readable storage medium of claim 54, wherein the reservation reserves sidelink resources for the second sidelink transmission, and wherein the code, when executed by the one or more processors, causes the first wireless device to determine the priority level of the second sidelink transmission for reception using the second RAT based, at least in part, on the reservation of the sidelink resources for the second sidelink transmission made by the prior sidelink transmission.

* * * * *